United States Patent Office 3,082,221
Patented Mar. 19, 1963

3,082,221
4-CHLORO-6α-METHYL DERIVATIVES OF TESTOSTERONE
Howard J. Ringold and George Rosenkranz, Mexico City, Mexico, assignors, by mesne assignments, to Syntex Corporation, a corporation of Panama
No Drawing. Filed Sept. 13, 1957, Ser. No. 683,693
Claims priority, application Mexico Sept. 17, 1956
2 Claims. (Cl. 260—397.4)

The present invention relates to novel cyclopentanophenanthrene compounds and to a process for the production thereof.

More particularly the present invention relates to novel 4-chloro-6α-methyl derivatives of testosterone, esters of testosterone, and 17α-lower alkyl-testosterone and to a novel process for the production of these compounds involving the production of novel intermediates. The 4-chloro-6α-methyl derivatives of testosterone, esters of testosterone and of 17α-lower alkyl-testosterone are hormones of the androgenic type characterized by a relatively high anabolic-androgenic ratio and are therefore especially useful compounds for treatment of those conditions where a hormone of this type is conventionally used.

In our U.S. patent application Serial No. 643,550, filed March 4, 1957, there is disclosed the production of 6-methyl testosterone and 6-methyl-17α-lower alkyl testosterone derivatives.

In accordance with the present invention it has been discovered that the 6-methyl-testosterone and 6-methyl-17α-lower alkyl testosterone derivatives of our prior application can be converted to the corresponding 4-chloro derivatives of 6α-methyl configuration by a novel process involving oxidation to form novel 4β,5β-epoxido derivatives, followed by reaction with hydrochloric acid.

The novel epoxido intermediates of the present invention may be illustrated by the following structural formula:

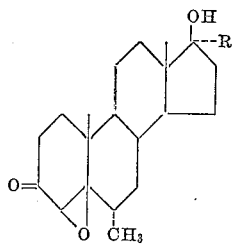

and in the above formula R may represent hydrogen or a lower alkyl group such as methyl, ethyl or propyl.

From the above intermediates by treatment with hydrochloric acid there may be prepared final compounds illustrated by the following formulas:

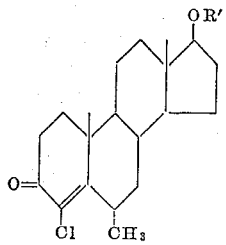

and

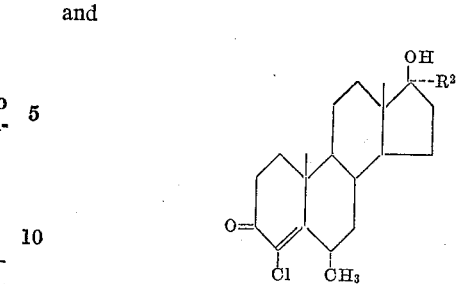

In the first of the above formulas R' may be hydrogen or R' may be an ester group of a hydrocarbon carboxylic acid of from 2 to 12 carbon atoms such as for example the acetate, propionate, butyrate, trimethylacetate, benzoate, hemisuccinate, hexanoate, cyclopentylpropionate, phenylpropionate etc. In the second of the above formulas R² represents a lower alkyl group such as methyl, ethyl or propyl and the tertiary hydroxyl group is incapable of conventional esterification.

The novel intermediates and final compounds above illustrated are produced according to a novel process exemplified by the following equation:

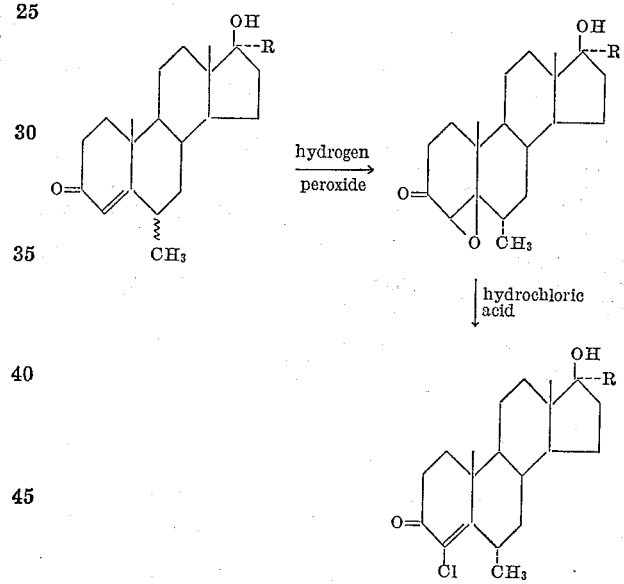

In the above equation R represents the same groups as heretofore set forth namely hydrogen or a lower alkyl group.

In practicing the process of the present invention as above outlined, a 6-methyl testosterone derivative of 6β-methyl or 6α-methyl configuration which may also have a 17α-lower alkyl substituent as indicated above is dissolved in an alcoholic solvent such as methanol and cooled to below room temperature as for example 0° C. The cooled solution is then mixed with aqueous hydrogen peroxide and aqueous strong alkali preferably alkali metal hydroxide which have been precooled. The reaction mixture is maintained for a long period of time below room temperature i.e. for example at 0° C. for a period of the order of 2 days. The product recovered and purified by conventional methods was uniformly the 4β,5β- epoxido-6α-methyl derivative whether or not a 6α or 6β-methyl starting material was used.

The epoxido intermediates thus prepared were then dissolved in an organic solvent such as acetone and treated with concentrated hydrochloric acid for a short period of time of the order of one hour at room temperature. The product recovered from this step was the desired 4-chloro-6α-methyl derivatives having a free hydroxy group at C–17. The product 4-chloro-6α-methyltestosterone was readily esterified with the same conventional ester groups as testosterone. These ester groups may be generally designated as those derived from hydrocarbon carboxylic acids of from 2 to 12 carbon atoms.

The following specific examples serve to illustrate but are not intended to limit the present invention.

Example I

A solution of 5 g. of 6β-methyltestosterone in 150 cc. of methanol was cooled to 0° C. and mixed with 10 cc. of a previously cooled 32% hydrogen peroxide solution and 10 cc. of 10% sodium hydroxide solution. The mixture was kept for 48 hours at 0° C. and then poured into 600 cc. of 20% aqueous sodium chloride solution. The product was extracted with methylene dichloride, washed with water to neutral, dried over anhydrous sodium sulfate and evaporated to dryness under vacuum. The residue was crystallized from acetone-hexane, thus giving 4β,5β-epoxido-6α-methyl-testan-17β-ol-3-one.

Example II

Starting from 6α-methyltestosterone and following method described in the previous example, there was obtained a product identical to the compound obtained in accordance with such example.

Example III

The treatment of the 6α-methyl or 6β-methyl derivatives of 17α-methyl, 17α-ethyl, or 17α-propyl testosterone by the method of Example I, afforded the corresponding 4β,5β-epoxides with an alkyl substituent at C–17α.

Example IV

A solution of 4 g. of 4β,5β-epoxido-6α-methyl-testan-17β-ol-3-one, obtained in accordance with Example I or II, in 80 cc. of acetone was treated with 4 cc. of concentrated hydrochloric acid; the mixture was kept at room temperature for 1 hour and then poured into 500 cc. of water. The precipitate was filtered, washed with water until neutral, dried in vacuum and recrystallized from acetone-hexane, thus yielding 4-chloro-6α-methyltestosterone.

Example V

Following the method of Example IV, and starting from the epoxides substituted at C–17, obtained in accordance with Example III, there were obtained 4-chloro-6α,17α-dimethyl-testosterone, 4-chloro-6α-methyl-17α-ethyl-testoterone and 4-chloro-6α-methyl-17α-propyl-testosterone.

Example VI

A mixture of 2 g. of 4-chloro-6α-methyl-testosterone, 10 cc. of anhydrous pyridine and 2 cc. of propionic anhydride was heated under anhydrous conditions for 2 hours on the steam bath and then the reaction mixture was poured into 100 cc. of water, and heated for half an hour on the steam bath in order to complete the hydrolysis of the excess propionic anhydride. During this time a crystalline precipitate separated which was collected by filtration, washed with water until neutral, dried and recrystallized from acetone-hexane. Thus there was obtained the propionate of 4-chloro-6α-methyl-testosterone.

Example VII

Following the conventional esterification method of the previous example, the reaction of 4-chloro-6α-methyl-testosterone with the anhydrides of chlorides of the corresponding acids, produced the following esters of 4-chloro-6α-methyl-testosterone, the trimethyl-acetate, propionate, butyrate, benzoate, hemisuccinate, hexanoate, cyclopentylpropionate, phenylpropionate and other esters with acid radicals having from 2 to 12 carbon atoms.

We claim:
1. 4-chloro-6α-methyl-17α-ethyl testosterone.
2. 4-chloro-6α-methyl-17α-propyl testosterone.

References Cited in the file of this patent
UNITED STATES PATENTS 2,933,510  Julian et al. _____ Apr. 19, 1960

OTHER REFERENCES

Journal American Chemical Society, Camerino et al., vol. 78 (1956), p. 3541.
Ringold et al.: Journ. of Org. Chem. (1957), vol. 22, pp. 99–100.